US011296813B2

(12) United States Patent
Lin

(10) Patent No.: US 11,296,813 B2
(45) Date of Patent: Apr. 5, 2022

(54) PACKET PROCESSING METHOD AND DEVICE

(71) Applicant: HUAWEI TECHNOLOGIES CO., LTD., Guangdong (CN)

(72) Inventor: Liankui Lin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/082,268

(22) Filed: Oct. 28, 2020

(65) Prior Publication Data

US 2021/0044374 A1    Feb. 11, 2021

Related U.S. Application Data

(63) Continuation of application No. PCT/CN2018/085087, filed on Apr. 28, 2018.

(51) Int. Cl.
*H04J 14/02* (2006.01)
*H04L 45/00* (2022.01)
(Continued)

(52) U.S. Cl.
CPC ...... *H04J 14/0267* (2013.01); *H04J 14/0212* (2013.01); *H04J 14/0213* (2013.01);
(Continued)

(58) Field of Classification Search
CPC .............. H04J 14/0267; H04J 14/0212; H04J 14/0213; H04J 14/0256; H04J 2203/0085;
(Continued)

(56) References Cited

U.S. PATENT DOCUMENTS 9,231,722 B2 * 1/2016 Hirth ..................... H04J 3/1694
2002/0067529 A1 * 6/2002 Yokomoto ......... H04Q 11/0062
398/168
(Continued)

FOREIGN PATENT DOCUMENTS

CN         101102158 A    1/2008
CN         106411454 A    2/2017
(Continued)

OTHER PUBLICATIONS

Office Action issued in Chinese Application No. 201880086081.8 dated Dec. 18, 2020, 5 pages.
(Continued)

*Primary Examiner* — Dibson J Sanchez
(74) *Attorney, Agent, or Firm* — Fish & Richardson P.C.

(57) ABSTRACT

Example packet processing methods and devices are described. One example method includes that a first device identifies a received first packet through a first FlexE shim layer disposed in the first device. When identifying that the first packet is a flexible Ethernet (FlexE) packet, the first device performs timeslot mapping on the first packet, then encapsulates the first packet into a first gigabit passive optical network encapsulation mode (GEM) frame. One first identifier is selected by the first device from at least one identifier reserved for a FlexE service, and is allocated to the first GEM frame, where the first identifier is used to indicate that the first GEM frame is a GEM frame corresponding to the FlexE packet. The first device sends the first GEM frame that carries the first identifier.

16 Claims, 7 Drawing Sheets

(51) Int. Cl.
*H04L 49/351* (2022.01)
*H04Q 11/00* (2006.01)

(52) U.S. Cl.
CPC ....... *H04J 14/0256* (2013.01); *H04J 14/0245* (2013.01); *H04L 45/66* (2013.01); *H04L 49/351* (2013.01); *H04Q 11/0062* (2013.01)

(58) Field of Classification Search
CPC ...... H04J 3/1658; H04J 14/02; H04J 14/0245; H04Q 2011/0064; H04Q 11/0067; H04Q 11/0062; H04B 10/27; H04L 1/00; H04L 45/66; H04L 49/351
USPC .................................................. 398/43–103
See application file for complete search history.

(56) References Cited

U.S. PATENT DOCUMENTS

| | | | | |
|---|---|---|---|---|
| 2004/0202470 | A1* | 10/2004 | Lim | H04Q 11/0067 398/51 |
| 2007/0025735 | A1* | 2/2007 | Sakamoto | H04J 3/1694 398/75 |
| 2007/0147835 | A1* | 6/2007 | Kim | H04J 14/025 398/71 |
| 2008/0205443 | A1* | 8/2008 | Shi | H04Q 11/0067 370/468 |
| 2008/0260385 | A1* | 10/2008 | Eguchi | H04J 3/1694 398/75 |
| 2009/0109972 | A1* | 4/2009 | Chen | H04L 45/00 370/390 |
| 2009/0304385 | A1* | 12/2009 | Khermosh | H04Q 11/0067 398/58 |
| 2011/0116796 | A1 | 5/2011 | Zheng | |
| 2014/0126907 | A1* | 5/2014 | Hirth | H04Q 11/0062 398/58 |
| 2014/0186039 | A1* | 7/2014 | Luo | H04L 12/287 398/66 |
| 2016/0088377 | A1* | 3/2016 | Peng | H04Q 11/0067 398/45 |
| 2016/0119075 | A1 | 4/2016 | Gareau et al. | |
| 2016/0294990 | A1* | 10/2016 | Cao | H04L 1/0083 |
| 2017/0005742 | A1 | 1/2017 | Gareau et al. | |
| 2017/0012731 | A1* | 1/2017 | Luo | H04L 69/22 |
| 2017/0302379 | A1* | 10/2017 | Bernard | H04B 10/272 |
| 2018/0013511 | A1* | 1/2018 | Hussain | H04J 14/0205 |
| 2019/0356501 | A1* | 11/2019 | Liu | H04L 47/10 |
| 2020/0007256 | A1* | 1/2020 | Liu | H04B 17/30 |
| 2020/0204285 | A1* | 6/2020 | Detwiler | H04J 14/0282 |
| 2020/0396097 | A1* | 12/2020 | Deng | H04J 3/1652 |
| 2021/0091871 | A1* | 3/2021 | Deng | H04L 12/2823 |

FOREIGN PATENT DOCUMENTS

| | | |
|---|---|---|
| CN | 106612203 A | 5/2017 |
| CN | 106911426 A | 6/2017 |
| CN | 107438028 A | 12/2017 |
| CN | 107888345 A | 4/2018 |
| EP | 2164221 A1 | 3/2010 |
| WO | 2013173665 A1 | 11/2013 |

OTHER PUBLICATIONS

PCT International Search Report and Written Opinion issued in International Application No. PCT/CN2018/085087 dated Jan. 23, 2019, 14 pages (with English translation).

Extended European Search Report issued in European Application No. 18916034.4 dated Mar. 25, 2021, 10 pages.

OIF Optical Internetworking Forum, "Flex Ethernet Implementation Agreement," IA OIF-FLEXE-01.1, Jun. 21, 2017, 36 pages.

* cited by examiner

PACKET PROCESSING METHOD AND DEVICE

CROSS-REFERENCE TO RELATED APPLICATIONS

This application is a continuation of International Application No. PCT/CN2018/085087, filed on Apr. 28, 2018, the disclosure of Which is hereby incorporated by reference in its entirety.

TECHNICAL FIELD

This application relates to the field of passive optical network technologies, and in particular, to a packet processing method and device.

BACKGROUND

A passive optical network (PON) is an optical access technology that uses a point-to-multipoint topology. FIG. 1 is a schematic structural diagram of a PON system. As shown in FIG. 1, the PON system includes an optical line termination (OLT), an optical distribution network (ODN), and user-side optical network terminations (ONT). The ODN is a passive optical splitting device, and is divided into three parts: a passive optical splitter, a feeder fiber, and a distribution fiber. In the PON system, the ODN splits one optical fiber into a plurality of optical fibers, and the ONTs share bandwidth. Transmission from the OLT to the ONT is downstream transmission, and transmission from the ONT to the OUT is upstream transmission. An upstream service is accessed in time division multiple access (TDMA) mode. Each ONT can send its own upstream data only in a timeslot allocated by the OLT. For a downstream service, information data is broadcast to the ONTs in time division multiplexing (TDM) mode. The ODN transmits downstream data from the OLT to each ONT, and aggregates and transmits upstream data from a plurality of ONTs to the OLT.

A transmission path in an existing PON system includes an OLT, an ODN, and an ONT. The OLT includes an upstream component, a switching and forwarding component, and a PON line card. The upstream component, the PON line card, and the ONT each include a network processor (NP)/traffic management (TM) module. The TM module mainly performs quality of service (QoS) control on a service flow based on transmission bandwidth of a network and a priority of the service flow. The NP is a core chip for processing an Ethernet service, and mainly performs forwarding processing tasks for various Ethernet services, for example, performs packet processing, protocol analysis, route searching, and the like on Ethernet service data. After a network-side Ethernet packet enters the OLE the NP/TM module in the upstream component of the OLT performs forwarding processing and quality of service control on the Ethernet packet. The NP/TM module in the PON line card performs forwarding processing on the Ethernet packet to a PON interface and quality of service control on a PON ingress packet. The NP/TM module in the ONT also needs to perform forwarding processing and quality of service control on the packet.

On the transmission path in the PON system, forwarding processing and quality of service control performed on the Ethernet packet by the NP/TM module at each level require a delay of several microseconds to dozens of microseconds. For some services such as mobile fronthaul, the delay is unacceptable to a user. Therefore, how to eliminate a delay caused by forwarding processing and quality of service control performed on the packet by the NP/TM module and implement low-delay transmission in the PON system is an urgent problem to be resolved.

SUMMARY

This application provides a packet processing method and device, to implement low-delay transmission.

According to a first aspect, this application provides a packet processing method, including: A first device identifies a received first packet through a first flexible Ethernet FlexE shim layer disposed in the first device. When identifying that the first packet is a FlexE packet, the first device performs timeslot mapping on the first packet, then encapsulates the first packet into a first GEM frame, selects one first identifier from at least one identifier reserved for a FlexE service, and allocates the first identifier to the first GEM frame, where the first identifier is used to indicate that the first GEM frame is a GEM frame corresponding to the FlexE packet. The first device sends the first GEM frame that carries the first identifier.

According to the packet processing method provided in the first aspect, the FlexE packet is first identified through the first FlexE shim layer disposed in the first device. Then timeslot mapping is directly performed on the FlexE packet, and the FlexE packet is encapsulated into the first GEM frame. In addition, the first identifier is selected from the at least one identifier reserved for the FlexE service and allocated to the first GEM frame. Finally, the first device sends the first GEM frame that carries the first identifier. A mapping relationship between the FlexE packet and a PON GEM frame identifier is established, so that the FlexE packet can pass through an OLT or ONT without entering an NP/TM module for forwarding processing and quality of service control. This can eliminate a delay on a transmission path of the packet caused by forwarding processing and quality of service control performed on the packet by the NP/TM module, and implement low-delay transmission.

In a possible design, the method further includes:

The first device identifies a received second packet through the first FlexE shim layer.

When identifying that the second packet is not a FlexE packet, the first device performs forwarding processing or quality of service control on the second packet.

The first device encapsulates, into a second GEM frame, the second packet on which forwarding processing or quality of service control has been performed, selects one second identifier from identifiers except the at least one identifier reserved for the FlexE service, and allocates the second identifier to the second GEM frame.

The first device sends the second GEM frame that carries the second identifier.

In a possible design, before the first device sends the first GEM frame that carries the first identifier, the method further includes:

The first device allocates a target PON channel based on bandwidth required by the first packet, and deletes, from bandwidths scheduled through PON DBA scheduling, bandwidth occupied by the target PON channel.

That the first device sends the first GEM frame that carries the first identifier includes:

The first device sends, over the target PON channel, the first GEM frame that carries the first identifier.

In a possible design, the first identifier is a GEM identifier, or the first identifier is an identifier in a packet type PTY field of the first GEM frame.

In a possible design, the first device is an optical line termination OLT, a second device is an optical network termination ONT, the first FlexE shim layer is disposed in a PON line card of the OLT, and a second FlexE shim layer is further disposed in the OLE When identifying, through the first FlexE shim layer, that the first packet carries a FlexE identifier, the first device determines that the first packet is the FlexE packet.

In a possible design, the method further includes:

The first device adds the FlexE identifier to the first packet when detecting, through the second FlexE shim layer, that the first packet carries a FlexE shim frame.

In a possible design, the first device is an ONT, and when detecting, through the first FlexE shim layer, that the first packet carries a FlexE shim frame, the first device determines that the first packet is the FlexE packet.

According to a second aspect, this application provides a packet processing method, including:

A first device receives a first GEM frame, where the first GEM frame carries a first identifier. When determining that the first identifier is one of at least one identifier reserved for a flexible Ethernet FlexE service, the first device determines that a first packet is a FlexE packet, performs timeslot mapping on the first packet, and sends the first packet obtained after the timeslot mapping.

According to the packet processing method provided in the second aspect, after receiving the first GEM frame, the first device first obtains the first packet through conversion based on the first GEM frame. When determining that the first identifier is one of the at least one identifier reserved for the flexible Ethernet FlexE service, the first device determines that the first packet is the FlexE packet, directly performs timeslot mapping on the first packet, and sends the first packet obtained after the timeslot mapping. The first packet obtained through conversion may not enter an NP/TM module for forwarding processing and quality of service control. This can eliminate a delay caused by forwarding processing and quality of service control performed on the packet by the NP/TM module, and implement low-delay transmission.

In a possible design, the first identifier is a GEM identifier, or the first identifier is an identifier in a packet type PTY field of the first GEM frame.

In a possible design, the first device is an optical network termination ONT, and the method further includes:

The first device receives a second GEM frame, where the second GEM frame carries a second identifier.

The first device obtains a second packet through conversion based on the second GEM frame.

When determining that the second identifier is not one of the at least one identifier reserved for the FlexE service, the first device determines that the second packet is not a FlexE packet, and performs forwarding processing or quality of service control on the second packet.

The first device sends the second packet on which forwarding processing or quality of service control has been performed.

In a possible design, the first device is an optical line termination OLT, and the method further includes:

The first device receives a second GEM frame, where the second GEM frame carries a second identifier.

The first device obtains a second packet through conversion based on the second GEM frame.

When determining that the second identifier is not one of the at least one identifier reserved for the FlexE service, the first device determines that the second packet is not a FlexE packet, and performs layer 1 forwarding processing or quality of service control on the second packet.

The first device switches and forwards the second packet on which layer 1 forwarding processing or quality of service control has been performed, and performs layer 2 forwarding processing or quality of service control.

The first device sends the second packet on which layer 2 forwarding processing or quality of service control has been performed.

According to a third aspect, this application provides a packet processing device, including:

a packet identification module, configured to identify a received first packet through a first flexible Ethernet FlexE shim layer disposed in the packet processing device;

a processing module, configured to: when the packet identification module identifies that the first packet is a FlexE packet, perform timeslot mapping on the first packet, then encapsulate the first packet into a first GEM frame, select one first identifier from at least one identifier reserved for a FlexE service, and allocate the first identifier to the first GEM frame, where the first identifier is used to indicate that the first GEM frame is a GEM frame corresponding to the FlexE packet; and a sending module, configured to send the first GEM frame that carries the first identifier.

In a possible design, the packet identification module is further configured to identify, a received second packet through the first FlexE shim layer.

The processing module is further configured to: when the packet identification module identifies that the second packet is not a FlexE packet, perform forwarding processing or quality of service control on the second packet; and encapsulate, into a second GEM frame, the second packet on which forwarding processing or quality of service control has been performed, select one second identifier from identifiers except the at least one identifier reserved for the FlexE service, and allocate the second identifier to the second GEM frame.

The sending module is further configured to send the second GEM frame that carries the second identifier.

In a possible design, the processing module is further configured to:

before the sending module sends the first GEM frame that carries the first identifier, allocate a target PON channel based on bandwidth required by the first packet, and delete, from bandwidths scheduled through PON dynamic bandwidth assignment DBA scheduling, bandwidth occupied by the target PON channel.

The sending module is specifically configured to send, over the target PON channel, the first GEM frame that carries the first identifier.

In a possible design, the first identifier is a GEM identifier, or the first identifier is an identifier in a packet type PTY field of the first GEM frame.

In a possible design, the packet processing device is an optical line termination OLT, the first FlexE shim layer is disposed in a PON line card of the OLT, a second FlexE shim layer is further disposed in the OLT, and the packet identification module is configured to:

wherein identifying, through the first FlexE shim layer, that the first packet carries a FlexE identifier, determine that the first packet is the FlexE packet.

In a possible design, the processing module is further configured to:

add the FlexE identifier to the first packet when detecting, through the second FlexE shim layer, that the first packet carries a FlexE shim frame.

In a possible design, the packet processing device is an ONT, and the packet identification module is configured to:

when detecting, through the first FlexE shim layer, that the first packet carries a FlexE shim frame, determine that the first packet is the FlexE packet.

For beneficial effects of the packet processing device provided in the third aspect and the possible designs of the third aspect, refer to the beneficial effects brought by the first aspect and the possible designs of the first aspect. Details are not described herein again.

According to a fourth aspect, this application provides a packet processing device, including:

a receiving module, configured to receive a first GEM frame, where the first GEM frame carries a first identifier;

a conversion module, configured to obtain a first packet through conversion based on the first GEM frame;

a processing module, configured to: when determining that the first identifier is one of at least one identifier reserved for a flexible Ethernet FlexE service, determine that the first packet is a FlexE packet, and perform timeslot mapping on the first packet; and a sending module, configured to send the first packet obtained after the timeslot mapping.

In a possible design, the first identifier is a GEM identifier, or the first identifier is an identifier in a packet type PTY field of the first GEM frame.

In a possible design, the packet processing device is an optical network termination ONT The receiving module is further configured to receive a second GEM frame, where the second GEM frame carries a second identifier.

The conversion module is further configured to obtain a second packet through conversion based on the second GEM frame.

The processing module is further configured to: when determining that the second identifier is not one of the at least one identifier reserved for the FlexE service, determine that the second packet is not a FlexE packet, and perform forwarding processing or quality of service control on the second packet.

The sending module is further configured to send the second packet on which forwarding processing or quality of service control has been performed.

In a possible design, the packet processing device is an optical line termination OLE The receiving module is further configured to receive a second GEM frame, where the second GEM frame carries a second identifier.

The conversion module is further configured to obtain a second packet through conversion based on the second GEM frame.

The processing module is further configured to: when determining that the second identifier is not one of the at least one identifier reserved for the FlexE service, determine that the second packet is not a FlexE packet, and perform layer 1 forwarding processing or quality of service control on the second packet; and switch and forward the second packet on which layer 1 forwarding processing or quality of service control has been performed, and perform layer 2 forwarding processing or quality of service control.

The sending module is further configured to send the second packet on which layer 2 forwarding processing or quality of service control has been performed.

For beneficial effects of the packet processing device provided in the fourth aspect and the possible designs of the fourth aspect, refer to the beneficial effects brought by the second aspect and the possible implementations of the second aspect. Details are not described herein again.

According to a fifth aspect, this application provides a packet processing device, including a memory and a processor.

The memory is configured to store a program instruction.

The processor is configured to invoke the program instruction in the memory to perform the packet processing method according to any one of the first aspect and the possible designs of the first aspect, or the packet processing method according to any one of the second aspect and the possible designs of the second aspect.

According to a sixth aspect, this application provides a computer-readable storage medium. The computer-readable storage medium stores an executable instruction. When at least one processor of a packet processing device executes the executable instruction, the packet processing device performs the packet processing method according to any one of the first aspect and the possible designs of the first aspect, or the packet processing method according to any one of the second aspect and the possible designs of the second aspect.

According to a seventh aspect, this application provides a program product. The program product includes an executable instruction, and the executable instruction is stored in a computer-readable storage medium. At least one processor of a packet processing device may read the executable instruction from the computer-readable storage medium. The at least one processor executes the executable instruction, so that the packet processing device implements the packet processing method according to any one of the first aspect and the possible designs of the first aspect, or the packet processing method according to any one of the second aspect and the possible designs of the second aspect.

DESCRIPTION OF EMBODIMENTS

On a transmission path in an existing PON system, forwarding processing acid quality of service control performed on an Ethernet packet by an NP/TM module at each level require a delay of several microseconds to dozens of microseconds. Therefore; this application provides a packet processing method and device, to eliminate a delay caused by forwarding processing and quality of service control performed on the packet by the NP/TM module, and implement low-delay transmission in the PON system. Specifically, a flexible Ethernet (Flex Eth, or FlexE) technology under rapid development is an interface technology for implementing service isolation and network slicing on a transport network, and is widely accepted by major standard organizations. In the flexible Ethernet technology, a FlexE shim layer is added between an Ethernet L2 (media access control, MAC) layer and an Ethernet L1 (physical layer, PHY) through lightweight enhancement to the Ethernet. The FlexE shim layer schedules and distributes data of a plurality of Ethernet client interfaces to different subchannels in timeslot mode according to a time division multiplexing distribution mechanism. A FlexE packet is identified before arriving at the Ethernet MAC layer. Therefore, TM processing is not required on a complete logical channel in most cases. To be specific, the packet may not enter the NP/TM module for forwarding processing and quality of service control. This can eliminate a delay caused by the NP/TM module on a transmission path of the packet, and implement low-delay transmission. However, in a current OLT because a mapping relationship between the FlexE packet and a PON GEM frame is not established, the FlexE packet cannot pass through the OLT to implement end-to-end low-delay transmission. In other words, after receiving a FlexE packet from the upstream, the OLT still forwards the FlexE packet in a conventional manner. This cannot implement low-delay transmission. In the packet processing method provided in this application, a FlexE shim layer is disposed in the OLT, and a mapping relationship between the FlexE packet and a PON GEM frame is established, so that the FlexE packet can pass through the OLT to implement end-to-end low-delay transmission. A FlexE shim layer is also disposed in an ONT, and the mapping relationship between the FlexE packet and the PON GEM frame is established to implement end-to-end low-delay transmission. The following describes the technical solutions of this application in detail with reference to the accompanying drawings.

The technical solutions of this application are applied to a PON system, and the PON system includes an OLT, an ODN, and an ONT.

Figure 1:
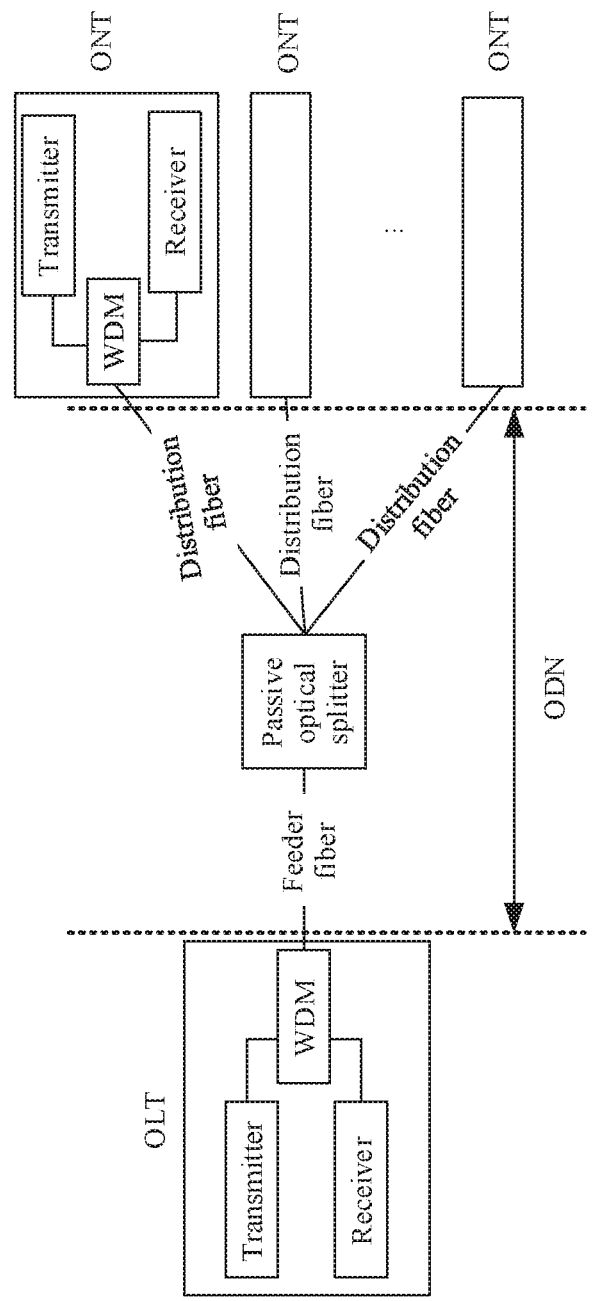
FIG. 1 is a schematic structural diagram of a PON system.
Figure 2:
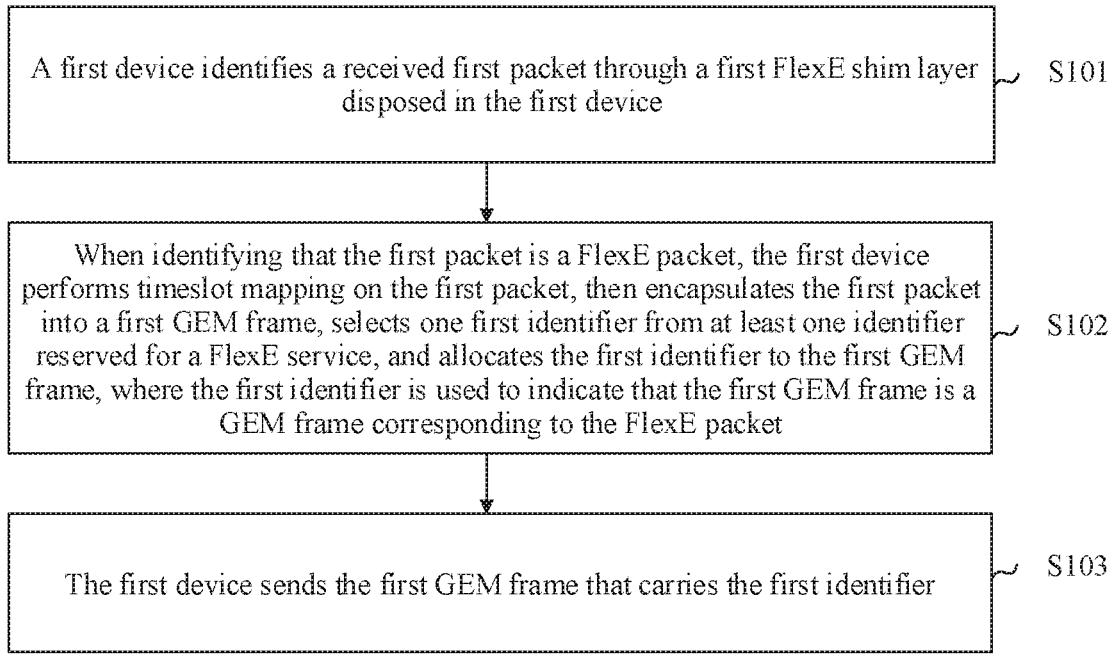
FIG. 2 is a flowchart of an embodiment of a packet processing method according to this application.

FIG. 2 is a flowchart of an embodiment of a packet processing method according to this application. As shown in FIG. 2, the method in this embodiment may include the following steps.

S101: A first device identifies a received first packet through a first FlexE shim layer disposed in the first device.

In this embodiment, the first device may be an OLT, and a device that receives a first GEM frame is an ONT. Alternatively, the first device may be an ONT and a device that receives a first GEM frame is an OLT. If the first device is the OLT, the first FlexE shim layer is disposed in a PON line card of the OLT. A second FlexE shim layer is further disposed in the OLT, and is disposed in an upstream component of the OLT. The second FlexE shim layer is disposed between a PHY and an Ethernet media access control (ETH MAC) layer in the upstream component. The FlexE shim layer may be hardware, software, or a combination thereof for identifying whether a packet is a FlexE packet. S101 may be: When identifying, through the first FlexE shim layer, that the first packet carries a FlexE identifier, the first device determines that the first packet is a FlexE packet. The FlexE identifier is a FlexE identifier added by the first device to the first packet when the first device detects, through the second FlexE shim layer, that the first packet carries a FlexE shim frame. Optionally, when detecting, through the second FlexE shim layer, that the first packet carries the FlexE shim frame, the first device adds the FlexE identifier to the first packet. In this case, the first packet that carries the FlexE identifier is directly switched by a switch unit, and does not need to enter an NP/TM module for forwarding processing and quality of service control. This can further reduce a delay in the OLT.

If the first device is the ONT, S101 may be: When detecting, through the first FlexE shim layer, that the first packet carries a FlexE shim frame, the first device determines that the first packet is a FlexE packet.

S102: When identifying that the first packet is the FlexE packet the first device performs timeslot mapping on the first packet, then encapsulates the first packet into a first gigabit passive optical network encapsulation mode (GEM) frame, selects one first identifier from at least one identifier reserved for a FlexE service, and allocates the first identifier to the first GEM frame, where the first identifier is used to indicate that the first GEM frame is a GEM frame corresponding to the FlexE packet.

Specifically, a plurality of particular identifiers are reserved in the first device for the FlexE service. A plurality of specific identifiers may be reserved, and any identifier may be selected from the plurality of identifiers and allocated to the first GEM frame. Alternatively, an identifier number segment may be reserved. For example, a number segment for a GEM identifier is 0-150, and a number segment 0-50 is reserved for the FlexE service. In this case, any identifier may be selected from 0-50 and allocated to the first GEM frame. It should be noted that the first device and a second device each reserve a plurality of particular identifiers, so that during downstream transmission, when receiving the first GEM frame, the second device can identify, based on the identifier of the first GEM frame, that the packet corresponding to the first GEM frame is a FlexE packet.

Optionally, the first identifier may be a GEM identifier, or the first identifier may be an identifier in a packet type (MY) field of the first GEM frame. The identifier in the PTY field is used to indicate that the first GEM frame is a GEM frame corresponding to the FlexE service, to facilitate fast identification and other subsequent processing to be performed on the first GEM frame.

S103: The first device sends the first GEM frame that carries the first identifier.

Specifically, when identifying that the first packet is the FlexE packet, the first device may obtain, when performing timeslot mapping on the first packet, bandwidth required by the first packet. Therefore, a PON channel used to transmit a current FlexE service may be allocated based on the bandwidth required by the first packet. Optionally, before S103 is performed, the method may further include:

The first device allocates a target PON channel based on the bandwidth required by the first packet, and deletes, from bandwidths scheduled through PON dynamic bandwidth assignment (DBA) scheduling, bandwidth occupied by the target PON channel. Bandwidth obtained after the bandwidth occupied by the target PON channel is deleted is used for dynamic assignment. This ensures that total bandwidth scheduling of a PON port is accurate and the bandwidth occupied by the PON channel does not exceed a bandwidth limit.

After the target PON channel is allocated, the target PON channel may continue to be used during transmission of a current FlexE packet.

Correspondingly, S103 may be specifically as follows: The first device sends, over the target PON channel, the first GEM frame that carries the first identifier.

In this embodiment, when the first device identifies that the received packet is not a FlexE packet, processing performed on the packet is the same as that in an existing processing procedure, and the processing procedure may include the following steps.

S101': The first device identifies a received second packet through the first FlexE shim layer.

S102': When identifying that the second packet is not a FlexE packet, the first device performs forwarding processing or quality of service control on the second packet.

Specifically, forwarding processing or quality of service control is performed on the second packet by an NP/TM module.

S103': The first device encapsulates, into a second GEM frame, the second packet on which forwarding processing or quality of service control has been performed, selects one second identifier from identifiers except the at least one identifier reserved for the FlexE service, and allocates the second identifier to the second GEM frame.

Specifically, the at least one particular identifier is reserved in the first device for the FlexE service, and the identifiers except the at least one identifier reserved for the FlexE service may be randomly allocated to a non-FlexE service.

S104': The first device sends the second GEM frame that carries the second identifier.

Specifically, the second GEM frame may be sent over a dynamically allocated PON channel through an ODN.

According to the packet processing method provided in this embodiment, the FlexE packet is first identified through the first FlexE shim layer disposed in the first device. Then, timeslot mapping is directly performed on the FlexE packet, and the FlexE packet is encapsulated into the first GEM frame. In addition, a GEM identifier is allocated to the first GEM frame based on a plurality of GEM identifiers reserved for the FlexE service. Finally, the first device sends the first GEM frame to the second device over the target PON channel through the ODN. A mapping relationship between the FlexE packet and a PON GEM frame identifier is established, so that the FlexE packet can pass through the OLT or ONT without entering the NP/TM module for forwarding processing and quality of service control. This can eliminate a delay on a transmission path of the packet caused by forwarding processing and quality of service control performed on the packet by the NP/TM module, and implement low-delay transmission.

The embodiment shown in FIG. 2 is a process in which the received FlexE packet is encapsulated into the GEM frame and then transmitted through the ODN. The following describes a process of converting a received GEM frame into a FlexE packet and transmitting the FlexE packet with reference to FIG. 3.

Figure 3:
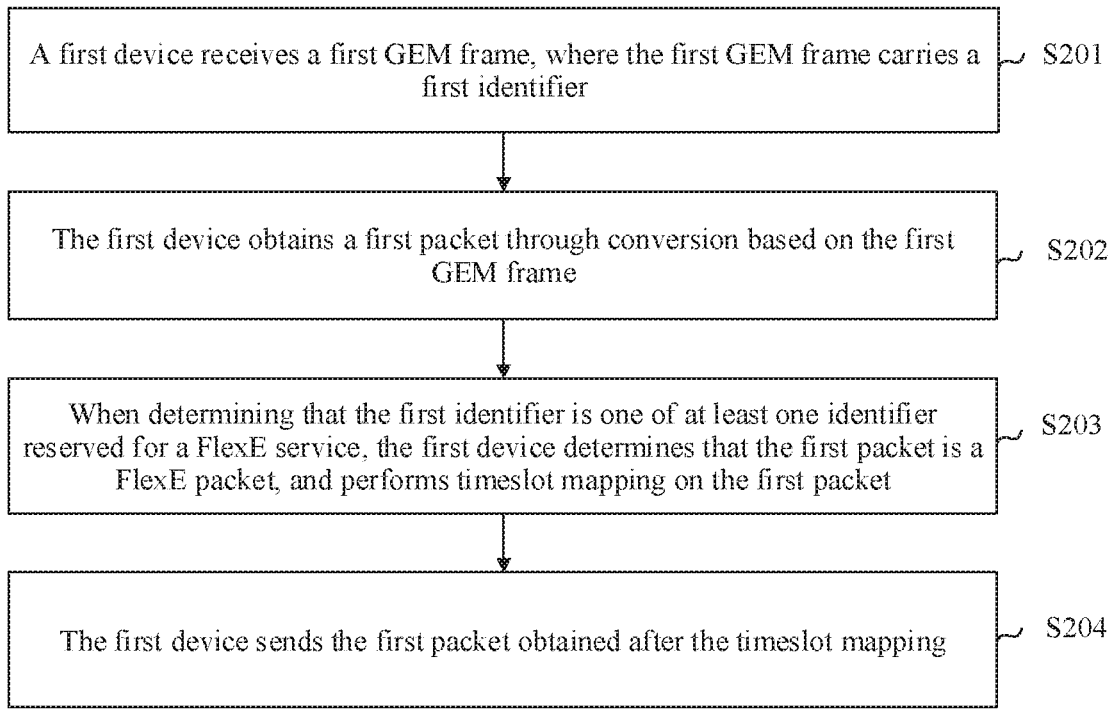
FIG. 3 is a flowchart of an embodiment of a packet processing method according to this application.

FIG. 3 is a flowchart of an embodiment of a packet processing method according to this application. As shown in FIG. 3, the method in this embodiment may include the following steps.

S201: A first device receives a first GEM frame, where the first GEM frame carries a first identifier.

Specifically, the first device may be an ONT. When the first device is the ONT, the first GEM frame is transmitted by an OLT to the ONT through an ODN. Alternatively, the first device may be an OLT. When the first device is the OLT the first GEM frame is transmitted by an ONT to the our through an ODN.

S202: The first device obtains a first packet through conversion based on the first GEM frame.

Specifically, the first device obtains an Ethernet frame, namely, the first packet, through conversion based on the first GEM frame.

S203: When determining that the first identifier is one of at least one identifier reserved for a FlexE service, the first device determines that the first packet is a FlexE packet, and performs timeslot mapping on the first packet.

S204: The first device sends the first packet obtained after the timeslot mapping.

Optionally, the first identifier is a GEM identifier, or the first identifier is an identifier in a packet type PTY field of the first GEM frame.

Same as the description in the foregoing embodiment, a transmit end device and a receive end device each reserve a plurality of particular identifiers, for example, identifiers in an identifier number segment 0-50, so that during downstream transmission, when receiving the first GEM frame, the receive end device can identify, based on an identifier of the first GEM frame, that a packet corresponding to the first GEM frame is a FlexE packet.

Specifically, when the first device determines, based on the first GEM frame, that the first packet is the FlexE packet, the first packet obtained through conversion does not enter an NP/TM module or a CPU module for forwarding processing and quality of service control, and the first device directly performs FlexE timeslot mapping on the first packet, and finally sends the first packet obtained after the timeslot mapping to a second device.

When the first packet is not a FlexE packet, for different types of the first device, there are the following two cases.

When the first device is an ONT, the method in this embodiment may include:

S201': The first device receives a second GEM frame, where the second GEM frame carries a second identifier.

S202': The first device obtains a second packet through conversion based on the second GEM frame.

S203': When determining that the second identifier is not one of the at least one identifier reserved for the FlexE service, the first device determines that the second packet is not a FlexE packet, and performs forwarding processing or quality of service control on the second packet.

S204': The first device sends the second packet on which forwarding processing or quality of service control has been performed.

When the first device is an OLT, the method in this embodiment may include:

S201": The first device receives a second GEM frame, where the second GEM frame carries a second identifier.

S202": The first device obtains a second packet through conversion based on the second GEM frame.

S203": When determining that the second identifier is not one of the at least one identifier reserved for the FlexE service, the first device determines that the second packet is not a FlexE packet, and performs layer 1 forwarding processing or quality of service control on the second packet.

S204": The first device switches and forwards the second packet on which layer 1 forwarding processing or quality of service control has been performed, and performs layer 2 forwarding processing or quality of service control.

S205": The first device sends the second packet on which layer 2 forwarding processing or quality of service control has been performed.

According to the packet processing method provided in this embodiment, after receiving the first GEM frame, the first device first obtains the first packet through conversion based on the first GEM frame. When determining, based on the first identifier carried in the first GEM frame, that the first packet is the FlexE packet, the first device directly performs timeslot mapping on the first packet, and sends the first packet obtained after the timeslot mapping. The first packet obtained through conversion may not enter the NP/TM module for forwarding processing and quality of service control. This can eliminate a delay caused by forwarding processing and quality of service control performed on the packet by the NP/TM module, and implement low-delay transmission.

The following uses two specific embodiments to describe in detail the technical solutions of the method embodiments shown in FIG. 2 and FIG. 3.

Figure 4:
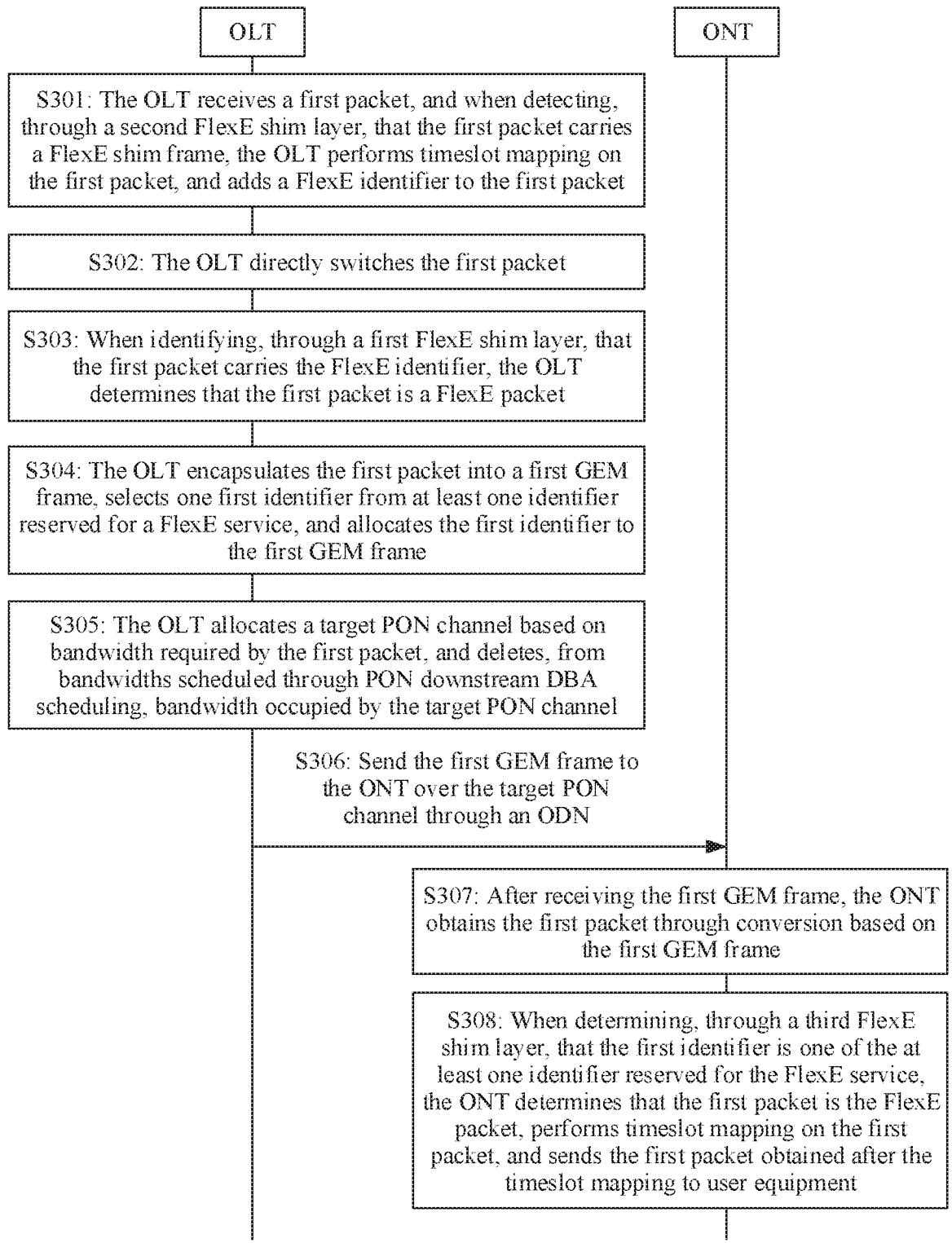
FIG. 4 is a flowchart of an embodiment of a packet processing method according to this application.

FIG. 4 is a flowchart of an embodiment of a packet processing method according to this application. In this embodiment, an example in which a first device is an OLT and a peer device is an ONT is used for description. A packet is transmitted from the OLT to the ONT in a downstream direction. A first FlexE shim layer is disposed in a PON line card of the OLT. A second FlexE shim layer is disposed in an upstream component of the OLT, and is disposed between a PHY and mm ETH MAC in the upstream component. A third FlexE shim layer is disposed in the ONT, and is disposed between a PHY and an ETH MAC in the ONT. The packet is transmitted from the OLT to the ONT in the downstream direction. As shown in FIG. 4, the method in this embodiment may include the following steps.

S301: The OLT receives a first packet, and when detecting, through the second FlexE shim layer, that the first packet carries a FlexE shim frame, the OLT performs timeslot mapping on the first packet, and adds a FlexE identifier to the first packet.

Specifically, the first packet may be a network-side packet. When detecting that the first packet carries the FlexE shim frame, the second FlexE shim layer may determine that the first packet is a FlexE packet, and add the FlexE identifier to the first packet to indicate that the first packet is the FlexE packet. The packet that carries the FlexE identifier may be directly switched to the PON line card without entering an NP/TM module for packet forwarding processing and quality of service control.

If the OLT does not detect, through the second FlexE shim layer, that the first packet carries the FlexE shim frame, the OUT performs processing based on a normal Ethernet packet processing procedure. To be specific, the first packet enters the NP/TM module for forwarding processing and quality of service control. For details, refer to processing processes in S101' to S104'. Details are not described herein again.

S302: The OLT directly switches the first packet.

S303: When identifying, through the first FlexE shim layer, that the first packet carries the FlexE identifier, the OLT determines that the first packet is the FlexE packet.

S304: The OLT encapsulates the first packet into a first GEM frame, selects one first identifier from at least one identifier reserved for a FlexE service, and allocates the first identifier to the first GEM frame, where the first identifier is used to indicate that the first GEM frame is a GEM frame corresponding to the FlexE packet.

Specifically, for example, the first identifier is a GEM identifier. The Our and the ONT each reserve a plurality of particular GEM identifiers, so that during downstream transmission, when receiving the first GEM frame, the ONT can identify, based on an identifier of the first GEM frame, that a packet corresponding to the first GEM frame is a FlexE packet.

S305: The OLT allocates a target PON channel based on bandwidth required by the first packet, and deletes, from bandwidths scheduled through PON downstream DBA scheduling, bandwidth occupied by the target PON channel.

Specifically, bandwidth obtained after the bandwidth occupied by the target PON channel is deleted is used for dynamic assignment. This ensures that total bandwidth scheduling of a PON port is accurate and the bandwidth occupied by the PON channel does not exceed a bandwidth limit.

In S305, the target PON channel is allocated. To be specific, a dedicated PON channel for the FlexE service is allocated. After first allocation, the dedicated PON channel may continue to be used during transmission of the current FlexE packet, and does not need to be allocated each time.

S306: The OLT sends the first GEM frame to the ONT over the target PON channel through an ODN.

S307: After receiving the first GEM frame, the ONT obtains the first packet through conversion based on the first GEM frame.

S308: When determining, through the third FlexE shim layer, that the first identifier is one of the at least one identifier reserved for the FlexE service, the ONT determines that the first packet is the FlexE packet, performs timeslot mapping on the first packet, and sends the first packet obtained after the timeslot mapping to user equipment.

If the ONT determines that the first packet is the FlexE packet, the first packet does not enter the NP/TM module for forwarding processing and quality of service control, the ONT directly performs timeslot mapping on the first packet, and sends the first packet obtained after the timeslot mapping to the user equipment.

If the ONT determines that the first packet is not a FlexE packet, the ONT performs forwarding processing or quality of service control on the first packet and then sends the first packet to the user equipment.

According to the packet processing method provided in this embodiment, first, the first FlexE shim layer and the second FlexE shim layer are disposed in the OLT, and the third FlexE shim layer is disposed in the ONT to identify a FlexE packet. The plurality of particular GEM identifiers are reserved in each of the OLT and the ONT for the FlexE packet. During downstream transmission, when the FlexE packet is encapsulated into a GEM frame, a GEM identifier is allocated to the GEM frame based on the plurality of reserved GEM identifiers. A mapping relationship between the FlexE packet and a PON GEM frame identifier is established, so that the FlexE packet can pass through the OLT and ONT without entering the NP/TM module for forwarding processing and quality of service control. This can eliminate a delay on a transmission path of the packet caused by forwarding processing and quality of service control performed on the packet by the NP/TM module, and implement low-delay transmission.

Figure 5:
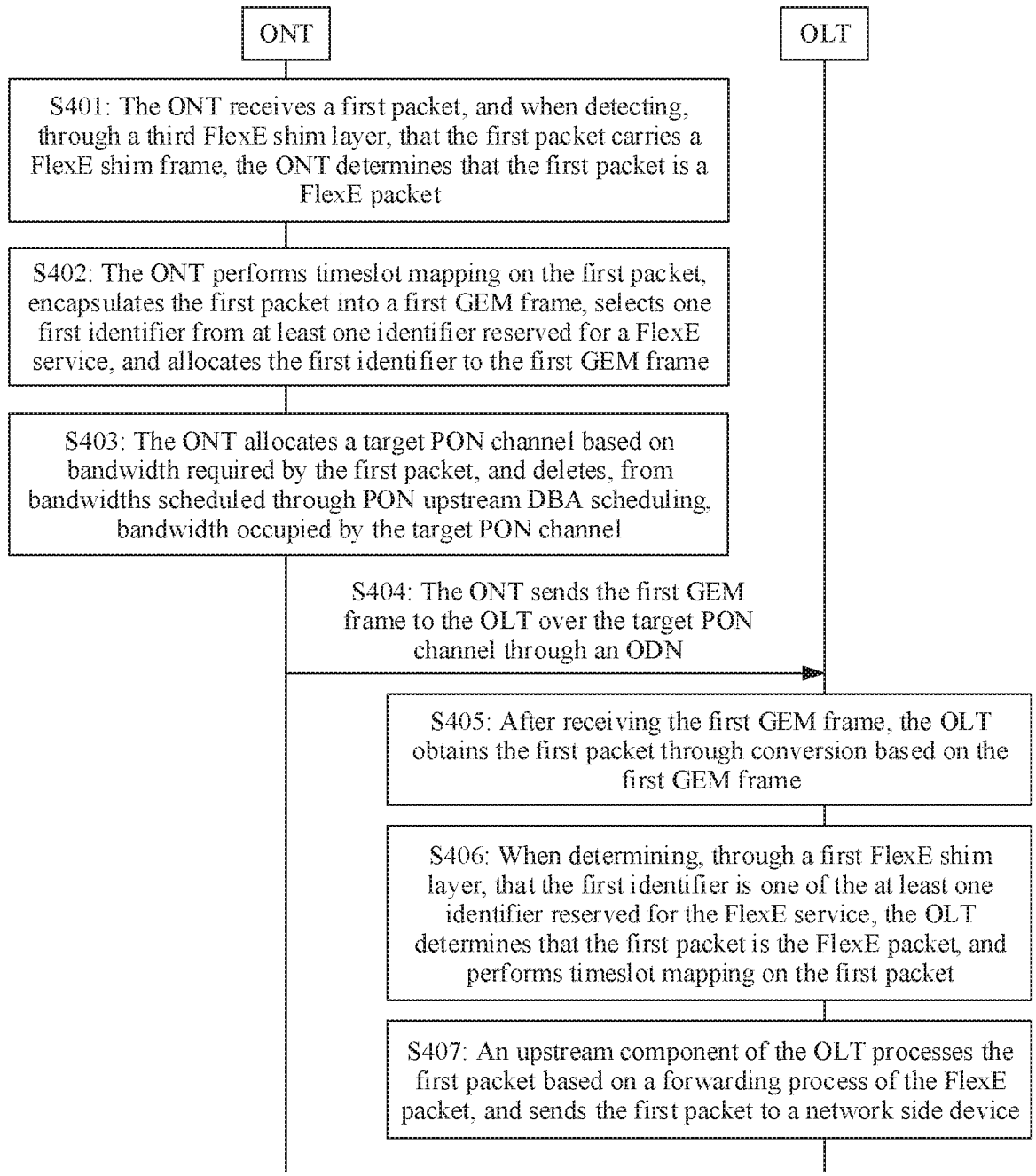
FIG. 5 is a flowchart of an embodiment of a packet processing method according to this application.

FIG. 5 is a flowchart of an embodiment of a packet processing method according to this application. In this embodiment, an example in which a first device is an ONT and a peer device is an OLT is used for description. A packet is transmitted from the ONT to the OLT in an upstream direction. A first FlexE shim layer is disposed in a PON line card of the OLT. A second FlexE shim layer is disposed in an upstream component of the OLT, and is disposed between a PHY and an ETH MAC in the upstream component. A third FlexE shim layer is disposed in the ONT and is disposed between a PHY and an ETH MAC in the ONT The packet is transmitted from the ONT to the our in the upstream direction. As shown in FIG. 5, the method in this embodiment may include the following steps.

S401: The ONT receives a first packet, and when detecting, through the third. FlexE shim layer, that the first packet carries a FlexE shim frame, the ONT determines that the first packet is a FlexE packet.

Specifically, the first packet may be a user data packet.

S402: The ONT performs timeslot mapping on the first packet, encapsulates the first packet into a first GEM frame, selects one first identifier from at least one identifier reserved for a FlexE service, and allocates the first identifier to the first GEM frame, where the first identifier is used to indicate that the first GEM frame is a GEM frame corresponding to the FlexE packet.

If the ONT does not detect, through the third FlexE shim layer, that the first packet carries the FlexE shim frame, the OLT performs processing based on a normal Ethernet packet processing procedure. To be specific, the first packet enters an NP/TM module for forwarding processing and quality of service control. For details, refer to processing processes in S101' to S104'. Details are not described herein again.

Specifically, for example, the first identifier is a GEM identifier. The OLT and the ONT each reserve a plurality of particular GEM identifiers, for example, identifiers in an identifier number segment 0-50, so that during upstream transmission, when receiving the first GEM frame, the OLT can identify, based on an identifier of the first GEM frame, that a packet corresponding to the first GEM frame is a FlexE packet.

S403: The ONT allocates a target PON channel based on bandwidth required by the first packet, and deletes, from bandwidths scheduled through PON upstream DBA scheduling, bandwidth occupied by the target PON channel.

Specifically, bandwidth obtained after the bandwidth occupied by the target PON channel is deleted is used for dynamic assignment. This ensures that total bandwidth scheduling of a PON port is accurate and the bandwidth occupied by the PON channel does not exceed a bandwidth limit.

In S403, the target PON channel is allocated. To be specific, a dedicated PON channel for the FlexE service is allocated. After first allocation, the dedicated PON channel may continue to be used during transmission of the current FlexE packet, and does not need to be allocated each time.

S404: The ONT sends the first GEM frame to the OLT over the target PON channel through an ODN.

S405: After receiving the first GEM frame, the OLT obtains the first packet through conversion based on the first GEM frame.

S406: When determining, through the first FlexE shim layer, that the first identifier is one of the at least one identifier reserved for the FlexE service, the OLT determines that the first packet is the FlexE packet, and performs timeslot mapping on the first packet.

S407: The upstream component of the OLT processes the first packet based on a forwarding process of the FlexE packet, and sends the first packet to a network side device.

If the OLT determines that the first packet is not a FlexE packet, the OLT performs layer 1 forwarding processing or quality of service control on the first packet. Then the OLT switches and forwards the first packet on which layer 1 forwarding processing or quality of service control has been performed, and performs layer 2 forwarding processing or quality of service control. Finally, the OLT sends the first packet on which layer 2 forwarding processing or quality of service control has been performed to the network side device.

According to the packet processing method provided in this embodiment, the first FlexE shim layer and the second FlexE shim layer are disposed in the OLT, and the third FlexE shim layer is disposed in the ONT, to identify a FlexE packet. The plurality of particular GEM identifiers are reserved in each of the OLT and the ONT for the FlexE packet. During upstream transmission, when the FlexE packet is encapsulated into a GEM frame, a GEM identifier is allocated to the GEM frame based on the plurality of reserved GEM identifiers. A mapping relationship between the FlexE packet and a PON GEM frame identifier is established, so that the FlexE packet can pass through the OLT and ONT without entering the NP/TM module for forwarding processing and quality of service control. This can eliminate a delay on a transmission path of the packet caused by forwarding processing and quality of service control performed on the packet by the NP/TM module, and implement low-delay transmission.

Figure 6:
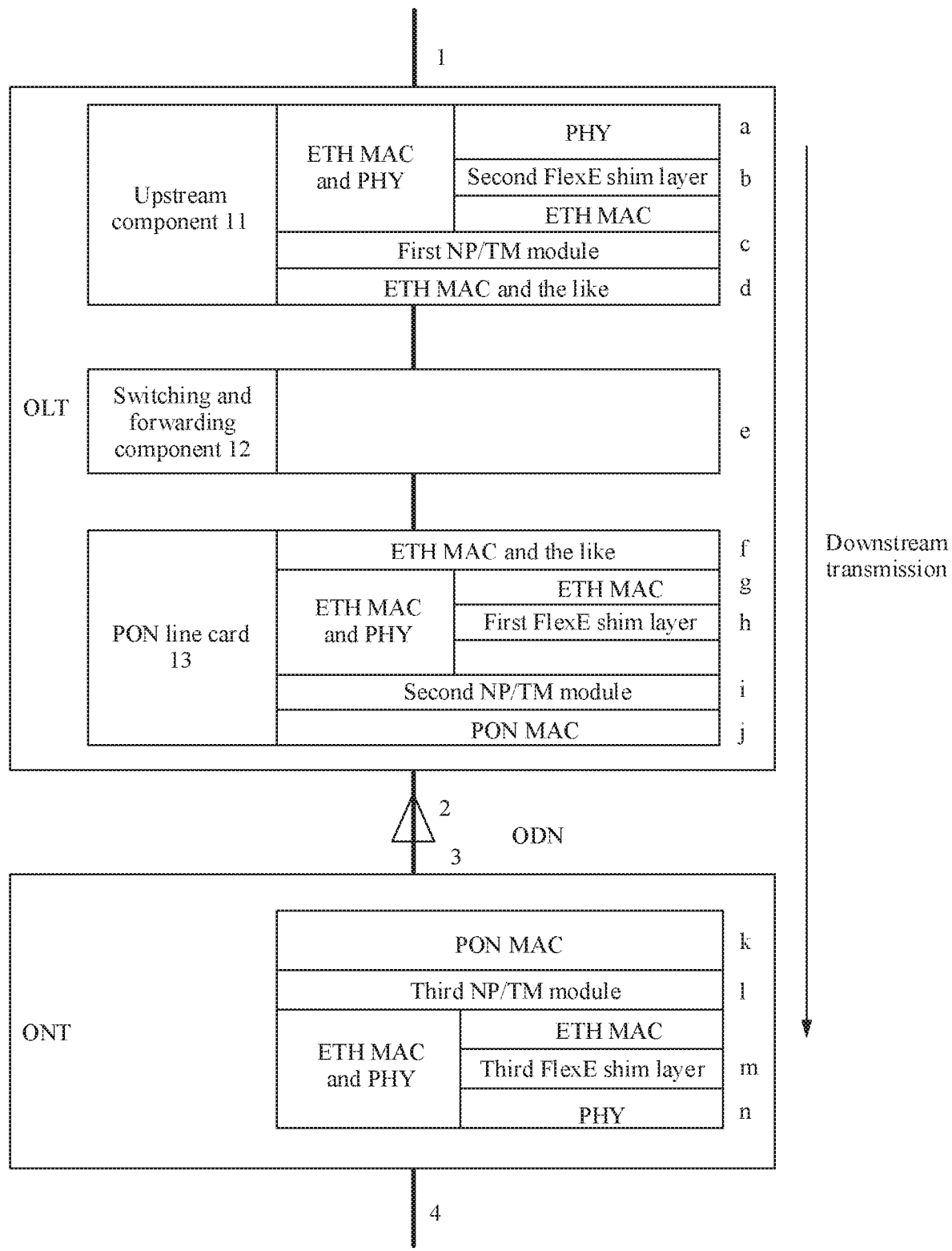
FIG. 6 is a schematic structural diagram of an embodiment of a PON system according to this application.

This application further provides a PON system. FIG. 6 is a schematic structural diagram of an embodiment of a PON system according to this application. As shown in FIG. 6, the PON system includes an OLT, an ODN, and an ONT. The OLT includes an upstream component 11, a switching and forwarding component 12, and a PON line card 13, A second FlexE shim layer (b) is disposed in the upstream component 11, a first FlexE shim layer (h) is disposed in the PON line card 13, and a third FlexE shim layer (m) is disposed in the ONT. As shown in FIG. 6, the second FlexE shim layer (b) is disposed between a PHY (a) and an ETH MAC in the upstream component 11. The first FlexE shim layer (h) is disposed between an ETH MAC (g) and a second NP/TM module (i) in the PON line card 13. The third FlexE shim layer (m) is disposed between art ETH MAC and PHY (n) in the ONT.

The upstream component 11 further includes a first NP/TM module (c), an ETH MAC and PHY, and an ETH MAC and the like (d).

The PON line card 13 further includes an ETH MAC and the like (f), an ETH MAC and PHY, and a PON MAC (j).

The ONT further includes a PON MAC k), a third NP/TM module (l), and an ETH MAC and PHY.

In this embodiment, the first FlexE shim layer (h) is disposed in the upstream component 11, the second FlexE shim layer (b) is disposed in the PON line card 13, the third FlexE shim layer (m) is disposed in the ONT, and a mapping relationship between a FlexE packet and a PON GEM frame is established. A FlexE packet may not enter an NP/TM module at each level for forwarding processing and quality of service control. This can eliminate a delay caused by forwarding processing and quality of service control performed on the packet by the NP/TM module, and implement low-delay transmission. The following describes a packet transmission process in detail with reference to upstream transmission and downstream transmission. The detailed process is as follows.

First, during downstream transmission:

S501: During downstream transmission, namely, transmission in a direction from the OLT to the ONT, a first packet sent from a network side enters the OLT through a port (1).

S502: When the second FlexE shim layer (b) in the upstream component 11 of the OLT detects that the first packet carries a FlexE shim frame, the second FlexE shim layer (b) performs timeslot mapping on the first packet, and adds a FlexE identifier to a first packet, the first packet that carries the FlexE identifier does not enter a first NP/TM module (c), but is directly transmitted to the switching and forwarding component 12 through the ETH MAC and the like (d).

S503: The switching and forwarding component 12 switches the received first packet to the PON line card 13.

Specifically, packet switching or cell switching may be performed.

S504: When identifying that the first packet carries the FlexE identifier, the first FlexE shim layer (h) in the PON line card 13 determines that the first packet is a FlexE packet, and the first packet does not enter the second NP/TM module (i), but is directly forwarded to the PON MAC (j).

S505: In the PON MAC (j), the PON MAC (j) encapsulates the first packet into a first GEM frame, selects one first identifier from at least one GEM identifier reserved for a FlexE service, and allocates the first identifier to the first GEM frame.

S506: The PON MAC (j) allocates a target PON channel based on bandwidth required by the first packet, and deletes, from bandwidths scheduled through PON downstream DBA scheduling, bandwidth occupied by the target PON channel. The PON MAC (j) sends the first GEM frame to the ONT from a PON line card interface (2) over the target PON channel through the ODN and an interface (3).

S507: After receiving the first GEM frame, the PON MAC (k) in the ONT obtains the first packet through conversion based on the first GEM frame. Because the PON MAC (k) can detect the GEM identifier in the first GEM frame, when determining that the GEM identifier in the first GEM frame is one of the at least one GEM identifier reserved for the FlexE service, the third FlexE shim layer m determines that the first packet is the FlexE packet.

S508: If the third FlexE shim layer (m) determines that the first packet is the FlexE packet, the first packet obtained through conversion does not enter the third NP/TM module (l), the third FlexE shim layer m performs timeslot mapping on the first packet, and finally sends, to user equipment through an interface (4), the first packet obtained after the timeslot mapping.

Second, during upstream transmission:

S601: During upstream transmission, namely, transmission in a direction from the ONT to the OLT, a first packet (namely, a user data packet) is input to the ONT through an interface (4).

S602: The ONT receives the first packet, and when detecting that the first packet carries a FlexE shim frame, the third FlexE shim layer (m) in the ONT determines that the first packet is a FlexE packet.

If no FlexE shim frame is detected, the user data packet is sent to the OLT from an ONT interface (3) based on an existing normal PON processing procedure.

S603: The first packet does not enter the third NP/TM module (l), but directly enters the PON MAC (k) after the ETH MAC performs timeslot mapping, and the PON MAC (k) encapsulates the first packet into a first GEM frame, selects one first identifier from at least one GEM identifier reserved for a FlexE service, and allocates the first identifier to the first GEM frame.

S604: The PON MAC (k) in the ONT allocates a target PON channel based on bandwidth required by the first packet, and deletes, from bandwidths scheduled through PON upstream DBA scheduling, bandwidth occupied by the target PON channel.

S605: The PON MAC (k) sends the first GEM frame to the OLT over the target PON channel through the ODN, and specifically, sends the first GEM frame from the ONT interface (3) to an OLT interface (2).

S606: The PON MAC (j) in the PON line card 13 of the OLT obtains the first packet through conversion based on the first GEM frame, and may specifically obtain the first packet by reassembling a GEM port identifier and a PTY identifier of the first GEM frame, and when determining that the first identifier is one of the at least one identifier reserved for the FlexE service, the first FlexE shim layer (h) determines that the first packet is the FlexE packet, and performs timeslot mapping on the first packet.

Specifically, the first packet does not enter the second NP/TM module (i) for processing. The ETH MAC and PHY perform timeslot mapping on the first packet, and then send the first packet to the switching and forwarding component 12. The switching and forwarding component 12 switches, to the upstream component 11, the first packet obtained after the timeslot mapping.

S607: In the upstream component 11, the first packet does not enter the first NP/TM module (c), but is directly sent to a network side device through the ETH MAC and PHY.

Figure 7:
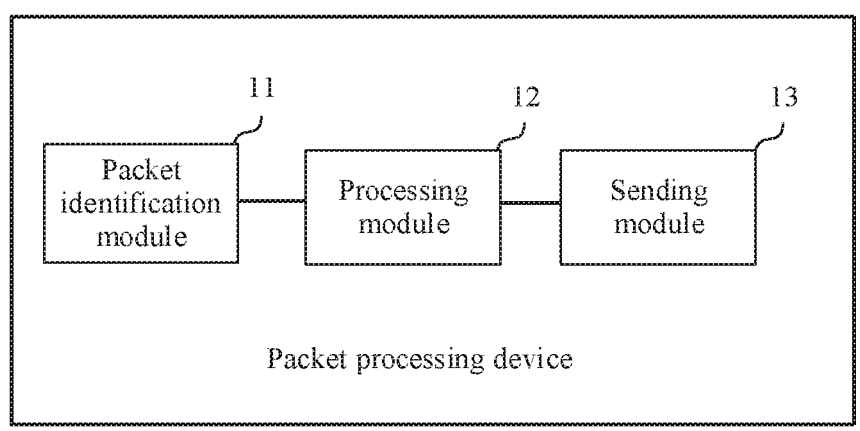
FIG. 7 is a schematic structural diagram of an embodiment of a packet processing device according to this application.

FIG. 7 is a schematic structural diagram of an embodiment of a packet processing device according to this application. As shown in FIG. 7, the packet processing device in this embodiment may include a packet identification module 11, a processing module 12, and a sending module 13.

The packet identification module 11 is configured to identify a received first packet through a first flexible Ethernet FlexE shim layer disposed in the packet processing device.

The processing module 12 is configured to: when the packet identification module 11 identifies that the first packet is a FlexE packet, perform timeslot mapping on the first packet, then encapsulate the first packet into a first GEM frame, select one first identifier from at least one identifier reserved for a FlexE service, and allocate the first identifier to the first GEM frame, where the first identifier is used to indicate that the first GEM frame is a GEM frame corresponding to the FlexE packet.

The sending module 13 is configured to send the first GEM frame that carries the first identifier.

Optionally, the packet identification module 11 is further configured to identify a received second packet through the first FlexE shim layer.

The processing module 12 is further configured to: when the packet identification module 11 identifies that the second packet is not a FlexE packet, perform forwarding processing or quality of service control on the second packet; and encapsulate, into a second GEM frame, the second packet on which forwarding processing or quality of service control has been performed, select one second identifier from identifiers except the at least one identifier reserved for the FlexE service, and allocate the second identifier to the second GEM frame.

The sending module 13 is further configured to send the second GEM frame that carries the second identifier.

Optionally, the processing module 12 is further configured to:

before the sending module 13 sends the first GEM frame that carries the first identifier, allocate a target PON channel based on bandwidth required by the first packet, and delete, from bandwidths scheduled through PON DBA scheduling, bandwidth occupied by the target PON channel.

The sending module 13 is specifically configured to send, over the target PON channel, the first GEM frame that carries the first identifier.

Optionally, the first identifier is a GEM identifier, or the first identifier is an identifier in a packet type PTY field of the first GEM frame.

Optionally, the device in this embodiment is an OLT, the first FlexE shim layer is disposed in a PON line card of the OLT and a second FlexE shim layer is further disposed in the OLT The packet identification module 11 is configured to: when identifying, through the first FlexE shim layer, that the first packet carries a FlexE identifier, determine that the first packet is the FlexE packet.

Optionally, the processing module 12 is further configured to add the FlexE identifier to the first packet when detecting, through the second FlexE shim layer, that the first packet carries a FlexE shim frame.

Optionally, the device in this embodiment is an ONT, and the packet identification module 11 is configured to: when detecting, through the first FlexE shim layer, that the first packet carries a FlexE shim frame, determine that the first packet is the FlexE packet.

The packet processing device in this embodiment may be configured to perform the technical solution in the method embodiment shown in FIG. 2. For an operation implemented by each module, refer to related descriptions in the method embodiment. Implementation principles and technical effects thereof are similar, and details are not described herein again. The module herein may be replaced by a component or a circuit.

Figure 8:
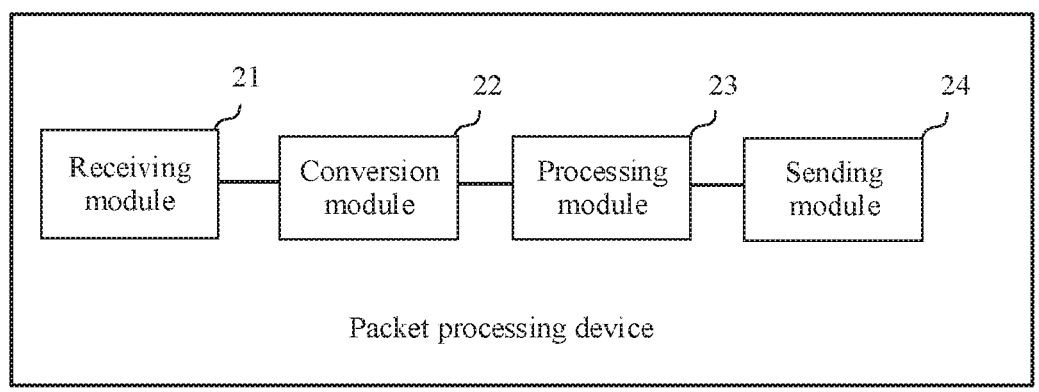
FIG. 8 is a schematic structural diagram of an embodiment of a packet processing device according to this application.

FIG. 8 is a schematic structural diagram of an embodiment of a packet processing device according to this application. As shown in FIG. 8, the packet processing device in this embodiment may include a receiving module 21, a conversion module 22, a processing module 23, and a sending module 24.

The receiving module 21 is configured to receive a first GEM frame, where the first GEM frame carries a first identifier.

The conversion module 22 is configured to obtain a first packet through conversion based on the first GEM frame.

The processing module 23 is configured to: when determining that the first identifier is one of at least one identifier reserved for a flexible Ethernet FlexE service, determine that the first packet is a FlexE packet, and perform timeslot mapping on the first packet.

The sending module 24 is configured to send the first packet obtained after the timeslot mapping.

Optionally, the first identifier is a GEM identifier, or the first identifier is an identifier in a PTY field of the first GEM frame.

Optionally, the packet processing device in this embodiment is an ONT, and the receiving module 21 is further configured to receive a second GEM frame, where the second GEM frame carries a second identifier.

The conversion module 22 is further configured to obtain a second packet through conversion based on the second GEM frame.

The processing module 23 is further configured to: when determining that the second identifier is not one of the at least one identifier reserved for the FlexE service, determine that the second packet is not a FlexE packet, and perform forwarding processing or quality of service control on the second packet.

The sending module 24 is further configured to send the second packet on which forwarding processing or quality of service control has been performed.

Optionally, the packet processing device in this embodiment is an OLT, and the receiving module 21 is further configured to receive a second GEM frame, where the second GEM frame carries a second identifier.

The conversion module 22 is further configured to obtain a second packet through conversion based on the second GEM frame.

The processing module 23 is further configured to: when determining that the second identifier is not one of the at least one identifier reserved for the FlexE service, determine that the second packet is not a FlexE packet, and perform layer 1 forwarding processing or quality of service control on the second packet; and switch and forward the second packet on which layer 1 forwarding processing or quality of service control has been performed, and perform layer 2 forwarding processing or quality of service control.

The sending module 24 is further configured to send the second packet on which layer 2 forwarding processing or quality of service control has been performed.

The packet processing device in this embodiment may be configured to perform the technical solution in the method embodiment shown in FIG. 3. For an operation implemented by each module, refer to related descriptions in the method embodiment. Implementation principles and technical effects thereof are similar, and details are not described herein again. The module herein may be replaced by a component or a circuit.

Figure 9:
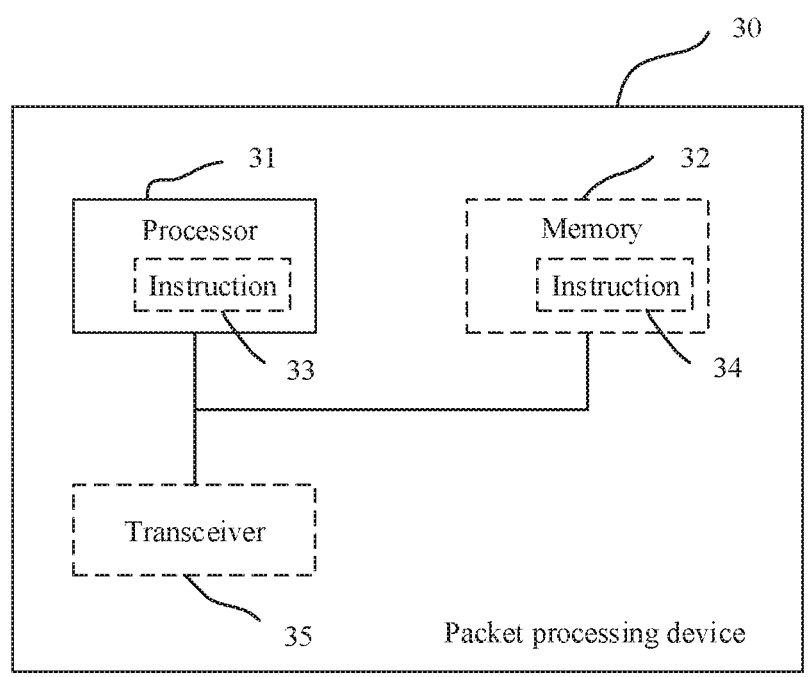
FIG. 9 is a schematic structural diagram of a packet processing device according to this application.

FIG. 9 is a schematic structural diagram of a packet processing device 30 according to this application. The packet processing device 30 may be an OLT or an ONT. The packet processing device 30 may be configured to implement a method in a corresponding part described in the foregoing method embodiments. For details, refer to the description in the foregoing method embodiments.

The packet processing device 30 may include one or more processors 31. The processor 31 may also be referred to as a processing unit, and may implement a specific control function. The processor 31 may be a general-purpose processor, a dedicated processor, or the like, for example, may be a baseband processor or a central processing unit. The baseband processor may be configured to process a communications protocol and communications data. The central processing unit may be configured to control a communications apparatus (for example, a base station, a baseband chip, a DU, or a CU), execute a software program, and process data of the software program.

In a possible design, the processor 31 may further store an instruction 33. The instruction 33 may be run by the processor 31, so that the packet processing device 30 performs the method that corresponds to the terminal or the network device and that is described in the foregoing method embodiments.

In another possible design, the packet processing device 30 may include a circuit. The circuit may implement the sending, receiving, or communication function in the foregoing method embodiments.

Optionally, the packet processing device 30 may include one or more memories 32. The memory stores an instruction 34 or intermediate data. The instruction 34 may be run on the processor 31, so that the packet processing device 30 performs the method described in the foregoing embodiments. Optionally, the memory may further store other related data. Optionally, the processor 31 may alternatively store an instruction and/or data. The processor 31 and the memory 32 may be separately disposed, or may be integrated together.

Optionally, the packet processing device 30 may further include a transceiver 35. The processor 31 may be referred to as a processing unit. The transceiver 35 may be referred to as a transceiver unit, a transceiver, a transceiver circuit, or the like, and is configured to implement a transceiver function of the communications apparatus.

This application further provides a computer-readable storage medium. The readable storage medium stores an executable instruction. When at least one processor of a packet processing device executes the executable instruction, the packet processing device performs the packet processing method in the foregoing method embodiments.

This application further provides a program product. The program product includes an executable instruction, and the executable instruction is stored in a readable storage medium. At least one processor of a packet processing device may read the executable instruction from the computer-readable storage medium. The at least one processor executes the executable instruction, so that the packet processing device implements the packet processing method in the foregoing method embodiments.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A packet processing method, wherein the method comprises:
   identifying, by a first device, a first packet through a first flexible Ethernet (FlexE) shim layer disposed in the first device;
   determining, by the first device, whether the first packet is a FlexE packet;
   in response to determining that the first packet is a FlexE packet,
      performing, by the first device, timeslot mapping on the first packet;
      encapsulating the first packet into a first gigabit passive optical network encapsulation mode (GEM) frame;
      selecting one first identifier from at least one identifier reserved for a FlexE service; and
      allocating the first identifier to the first GEM frame, wherein the first identifier is used to indicate that the first GEM frame is a GEM frame corresponding to the FlexE packet;
   sending, by the first device, the first GEM frame that carries the first identifier;
   identifying, by the first device, a second packet through the first FlexE shim layer;
   when identifying that the second packet is not a FlexE packet,
      performing, by the first device, forwarding processing or quality of service control on the second packet;
      encapsulating, by the first device into a second GEM frame, the second packet on which forwarding processing or quality of service control has been performed;
      selecting one second identifier from identifiers except the at least one identifier reserved for the FlexE service; and
      allocating the second identifier to the second GEM frame; and
   sending, by the first device, the second GEM frame that carries the second identifier.

2. The method according to claim 1, wherein before the sending, by the first device, the first GEM frame that carries the first identifier, the method further comprises:
   allocating, by the first device, a target passive optical network (PON) channel based on bandwidth required by the first packet; and
   deleting, from bandwidths scheduled through PON dynamic bandwidth assignment (DBA) scheduling, bandwidth occupied by the target PON channel; and
   wherein the sending, by the first device, the first GEM frame that carries the first identifier comprises:
      sending, by the first device over the target PON channel, the first GEM frame that carries the first identifier.

3. The method according to claim 1, wherein:
   the first identifier is a GEM identifier; or
   the first identifier is an identifier in a packet type (PTY) field of the first GEM frame.

4. The method according to claim 3, wherein the first device is an optical line termination (OLT), wherein the first FlexE shim layer is disposed in a PON line card of the OLT, wherein a second FlexE shim layer is further disposed in the OLT, and
   wherein the method further comprises:
      when identifying, through the first FlexE shim layer, that the first packet carries a FlexE identifier, determining, by the first device, that the first packet is the FlexE packet.

5. The method according to claim 4, wherein the method further comprises:
   adding, by the first device, the FlexE identifier to the first packet when detecting, through the second FlexE shim layer, that the first packet carries a FlexE shim frame.

6. The method according to claim 3, wherein the first device is an optical network termination (ONT), and wherein the method further comprises:
   when detecting, through the first FlexE shim layer, that the first packet carries a FlexE shim frame, determining, by the first device, that the first packet is the FlexE packet.

7. A packet processing method, comprising:
   receiving, by a first device, a first gigabit passive optical network encapsulation mode (GEM) frame, wherein the first GEM frame carries a first identifier, wherein the first device is an optical line termination (OLT);

obtaining, by the first device, a first packet through conversion based on the first GEM frame;

determining, by the first device, whether the first identifier is one of at least one identifier reserved for a flexible Ethernet (FlexE) service;

in response to determining that the first identifier is one of at least one identifier reserved for a FlexE service,
determining, by the first device, that the first packet is a FlexE packet; and
performing timeslot mapping on the first packet;

sending, by the first device, the first packet obtained after the timeslot mapping, receiving, by the first device, a second GEM frame, wherein the second GEM frame carries a second identifier;

obtaining, by the first device, a second packet through conversion based on the second GEM frame;

when determining that the second identifier is not one of the at least one identifier reserved for the FlexE service,
determining, by the first device, that the second packet is not a FlexE packet; and
performing layer 1 forwarding processing or quality of service control on the second packet;

switching and forwarding, by the first device, the second packet on which layer 1 forwarding processing or quality of service control has been performed;

performing layer 2 forwarding processing or quality of service control; and sending, by the first device, the second packet on which layer 2 forwarding processing or quality of service control has been performed.

8. The method according to claim 7, wherein the first identifier is a GEM identifier, or the first identifier is an identifier in a packet type (PTY) field of the first GEM frame.

9. The method according to claim 7, wherein the first device is an optical network termination (ONT), and wherein the method further comprises:
receiving, by the first device, a second GEM frame, wherein the second GEM frame carries a second identifier;
obtaining, by the first device, a second packet through conversion based on the second GEM frame;
when determining that the second identifier is not one of the at least one identifier reserved for the FlexE service,
determining, by the first device, that the second packet is not a FlexE packet; and
performing forwarding processing or quality of service control on the second packet; and
sending, by the first device, the second packet on which forwarding processing or quality of service control has been performed.

10. A packet processing device, comprising:
at least one processor;
a non-transitory computer-readable storage medium coupled to the at least one processor and storing programming instructions for execution by the at least one processor, wherein the programming instructions instruct the at least one processor to:
identify a first packet through a first flexible Ethernet (FlexE) shim layer disposed in the packet processing device;
determine whether the first packet is a FlexE packet, in response to determining that the first packet is a FlexE packet,
perform timeslot mapping on the first packet;
encapsulate the first packet into a first gigabit passive optical network encapsulation mode (GEM) frame;
select one first identifier from at least one identifier reserved for a FlexE service; and
allocate the first identifier to the first GEM frame, wherein the first identifier is used to indicate that the first GEM frame is a GEM frame corresponding to the FlexE packet;
send the first GEM frame that carries the first identifier;
identify a second packet through the first FlexE shim layer;
when identifying that the second packet is not a FlexE packet,
perform forwarding processing or quality of service control on the second packet;
encapsulate, into a second GEM frame, the second packet on which forwarding processing or quality of service control has been performed;
select one second identifier from identifiers except the at least one identifier reserved for the FlexE service; and
allocate the second identifier to the second GEM frame; and
send the second GEM frame that carries the second identifier.

11. The device according to claim 10, wherein the programming instructions instruct the at least one processor to:
before sending the first GEM frame that carries the first identifier,
allocate a target passive optical network (PON) channel based on bandwidth required by the first packet; and
delete, from bandwidths scheduled through PON dynamic bandwidth assignment (DBA) scheduling, bandwidth occupied by the target PON channel; and
send, over the target PON channel, the first GEM frame that carries the first identifier.

12. The device according to claim 10, wherein the packet processing device is an optical line termination (OLT), wherein the first FlexE shim layer is disposed in a PON line card of the OLT, wherein a second FlexE shim layer is further disposed in the OLT, and wherein the programming instructions instruct the at least one processor to:
when identifying, through the first FlexE shim layer, that the first packet carries a FlexE identifier, determine that the first packet is the FlexE packet.

13. The device according to claim 12, wherein the programming instructions instruct the at least one processor to:
add the FlexE identifier to the first packet when detecting, through the second FlexE shim layer, that the first packet carries a FlexE shim frame.

14. The device according to claim 10, wherein the packet processing device is an ONT, and wherein the programming instructions instruct the at least one processor to:
when detecting, through the first FlexE shim layer, that the first packet carries a FlexE shim frame, determine that the first packet is the FlexE packet.

15. A packet processing device, wherein the packet processing device is an optical line termination (OLT) and comprises:
at least one processor;
a non-transitory computer-readable storage medium coupled to the at least one processor and storing programming instructions for execution by the at least one processor, wherein the programming instructions instruct the at least one processor to:

receive a first gigabit passive optical network encapsulation mode (GEM) frame, wherein the first GEM frame carries a first identifier;
obtain a first packet through conversion based on the first GEM frame;
determine whether the first identifier is one of at least one identifier reserved for a flexible Ethernet (FlexE) service;
in response to determining that the first identifier is one of at least one identifier reserved for a FlexE service, determine that the first packet is a FlexE packet; and perform timeslot mapping on the first packet;
send the first packet obtained after the timeslot mapping;
receive a second GEM frame, wherein the second GEM frame carries a second identifier;
obtain a second packet through conversion based on the second GEM frame;
when determining that the second identifier is not one of the at least one identifier reserved for the FlexE service,
 determine that the second packet is not a FlexE packet; and
 perform layer 1 forwarding processing or quality of service control on the second packet;
switch and forward the second packet on which layer 1 forwarding processing or quality of service control has been performed;
perform layer 2 forwarding processing or quality of service control; and
send the second packet on which layer 2 forwarding processing or quality of service control has been performed.

16. The device according to claim 15, wherein the packet processing device is an optical network termination (ONT), and wherein the programming instructions instruct the at least one processor to:
receive a second GEM frame, wherein the second GEM frame carries a second identifier;
obtain a second packet through conversion based on the second GEM frame;
when determining that the second identifier is not one of the at least one identifier reserved for the FlexE service, determine that the second packet is not a FlexE packet; and
perform forwarding processing or quality of service control on the second packet; and
send the second packet on which forwarding processing or quality of service control has been performed.

* * * * *

UNITED STATES PATENT AND TRADEMARK OFFICE
CERTIFICATE OF CORRECTION

PATENT NO. : 11,296,813 B2
APPLICATION NO. : 17/082268
DATED : April 5, 2022
INVENTOR(S) : Liankui Lin It is certified that error appears in the above-identified patent and that said Letters Patent is hereby corrected as shown below:

In the Specification

In Column 1 Line 9, Delete "Which" and insert -- which --.

Signed and Sealed this
Twelfth Day of July, 2022

Katherine Kelly Vidal
*Director of the United States Patent and Trademark Office*